(12) United States Patent
Ying et al.

(10) Patent No.: US 10,958,766 B1
(45) Date of Patent: Mar. 23, 2021

(54) METHOD, DEVICE AND COMPUTER PROGRAM PRODUCT FOR CONTROLLING A GAME

(71) Applicant: EMC IP Holding Company LLC, Hopkinton, MA (US)

(72) Inventors: Zhi Ying, Shanghai (CN); Pengfei Wu, Shanghai (CN); Jinpeng Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/734,515

(22) Filed: Jan. 6, 2020

(30) Foreign Application Priority Data

Sep. 26, 2019 (CN) .......................... 201910919601.5

(51) Int. Cl.
*H04L 29/06* (2006.01)
*A63F 13/358* (2014.01)
*H04L 29/08* (2006.01)

(52) U.S. Cl.
CPC ............ *H04L 67/38* (2013.01); *A63F 13/358* (2014.09); *A63F 2300/534* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,613,321 B2 * | 11/2009 | Altherr | G06T 7/246 382/103 |
| 8,619,198 B1 * | 12/2013 | Andreev | G11B 27/28 348/701 |
| 8,678,929 B1 * | 3/2014 | Nishimura | A63F 13/46 463/42 |
| 2013/0151651 A1 * | 6/2013 | Chhaochharia | A63F 13/358 709/214 |

OTHER PUBLICATIONS

Sookocheff. "How Does TCP Work?". Posted at https://sookocheff.com/post/networking/how-does-tcp-work/ on May 15, 2019 (Year: 2019).*
K. Lee et al., "Outatime: Using Speculation to Enable Low-Latency Continuous Interaction for Mobile Cloud Gaming," Proceedings of the 13th Annual International Conference on Mobile Systems, Applications, and Services (MobiSys), May 2015, pp. 151-165.

* cited by examiner

*Primary Examiner* — Scott B Christensen
(74) *Attorney, Agent, or Firm* — Ryan, Mason & Lewis, LLP (57) ABSTRACT

Embodiments of the present disclosure provide a method, a device and a computer program product for controlling a game. The method comprises: in response to receiving an input of a user for a game at a terminal device, sending a message indicating the input to a network device; receiving a candidate game frame from a network device, where the candidate game frame is a game frame in the game that is possible to occur subsequent to a target game frame corresponding to the input, and the candidate game frame is determined by the network device based on a message (Continued)

indicating the input; and storing the candidate game frame in a game frame buffer. In such a manner, the embodiments of the present disclosure can reduce the delay of responding to an input of a user for a game.

20 Claims, 6 Drawing Sheets

METHOD, DEVICE AND COMPUTER PROGRAM PRODUCT FOR CONTROLLING A GAME

RELATED APPLICATION(S)

The present application claims priority to Chinese Patent Application No. 201910919601.5, filed Sep. 26, 2019, and entitled "Method, Device and Computer Program Product for Controlling a Game," which is incorporated by reference herein in its entirety.

FIELD

Embodiments of the present disclosure generally relate to the field of computers, and more specifically, to a method, a device and a computer program product for controlling a game.

BACKGROUND

With the development of computer technology, cloud gaming has become more and more popular in recent years. Unlike conventional gaming technology, the games of cloud gaming are running in the cloud without installing games on user terminals. The user's manipulation commands for the game are sent to the cloud, and images of the game (also referred to as "game frames") are sent to the user terminal for display. However, due to factors such as network delay, cloud gaming has a response delay, not expected by users.

SUMMARY

Embodiments of the present disclosure provide a solution for controlling a game.

In accordance with a first aspect of the present disclosure, there is provided a method for controlling a game. The method comprises: in response to receiving, at a terminal device, an input of a user for a game, sending to a network device a message indicating the input; receiving a candidate game frame from the network device, the candidate game frame being a frame in the game which is possible to occur subsequent to a target game frame corresponding to the input, the candidate game frame being determined by the network device based on the message indicating the input; and storing the candidate game frame in a game frame buffer.

In accordance with a second aspect of the present disclosure, there is provided a method for controlling a game. The method comprises: in response to receiving a message from a terminal device indicating an input of a user for a game, determining a candidate game frame, the candidate game frame being a frame in the game which is possible to occur subsequent to a target game frame corresponding to the input; and sending the candidate game frame to the terminal device.

In accordance with a third aspect of the present disclosure, there is provided an electronic device. The device comprises: at least one processing unit; and at least one memory being coupled to the at least one processing unit and storing instructions for execution by the at least one processing unit, the instructions, when executed by the at least one processing unit, causing the device to perform acts. The acts comprise: in response to receiving, at a terminal device, an input of a user for a game, sending to a network device a message indicating the input; receiving a candidate game frame from the network device, the candidate game frame being a frame in the game which is possible to occur subsequent to a target game frame corresponding to the input, the candidate game frame being determined by the network device based on the message indicating the input; and storing the candidate game frame in a game frame buffer.

In accordance with a fourth aspect of the present disclosure, there is provided an electronic device. The device comprises: at least one processing unit; and at least one memory being coupled to the at least one processing unit and storing instructions for execution by the at least one processing unit, the instructions, when executed by the at least one processing unit, causing the device to perform acts. The acts comprise: in response to receiving a message from a terminal device indicating an input of a user for a game, determining a candidate game frame, the candidate game frame being a frame in the game which is possible to occur subsequent to a target game frame corresponding to the input; and sending the candidate game frame to the terminal device.

In accordance with a fifth aspect of the present disclosure, there is provided a computer program product stored in a non-transitory computer storage medium and comprising machine-executable instructions which, when executed by a device, cause the device to perform an action according to any steps of the method in the first aspect.

In accordance with a sixth aspect of the present disclosure, there is provided a computer program product stored in a non-transitory computer storage medium and comprising machine-executable instructions which, when executed by a device, cause the device to perform an action according to any steps of the method in the second aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

DETAILED DESCRIPTION

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first," "a second" and others may denote different or identical objects. The following text may also contain other explicit or implicit definitions.

As discussed above, cloud gaming has become an increasingly popular architecture. However, according to the existing architecture, the delay of a cloud game's response to player input includes not only a delay of receiving an input of a player, but also a communication delay of obtaining a game frame corresponding to the input from the server. Such delays are often unacceptable for games with high real-time requirements, which would significantly affect the player's gaming experience.

According to an embodiment of the present disclosure, there is proposed a solution for controlling a game. In this solution, in response to receiving a user's input for a game at a terminal device, a message indicating the user input is sent to a network device. Subsequently, a candidate game frame is received from the network device. The candidate game frame is a game frame in the game which is possible to occur subsequent to a target game frame corresponding to the user input, and the candidate game frame is determined based on the message indicating the input. The candidate game frame can be stored in the game frame buffer.

In another aspect, the network device determines a candidate game frame in response to receiving a message from the terminal device indicating the user's input for the game. The candidate game frame is a game frame in the game which is possible to occur subsequent to a target game frame corresponding to the user input. The network device then sends the candidate game frame to the terminal device. In such a manner, the solution according to the embodiment of the present disclosure can buffer in advance game frames that are possible to occur in the terminal device, thereby reducing the delay of responding to the user input for the game.

Figure 1:
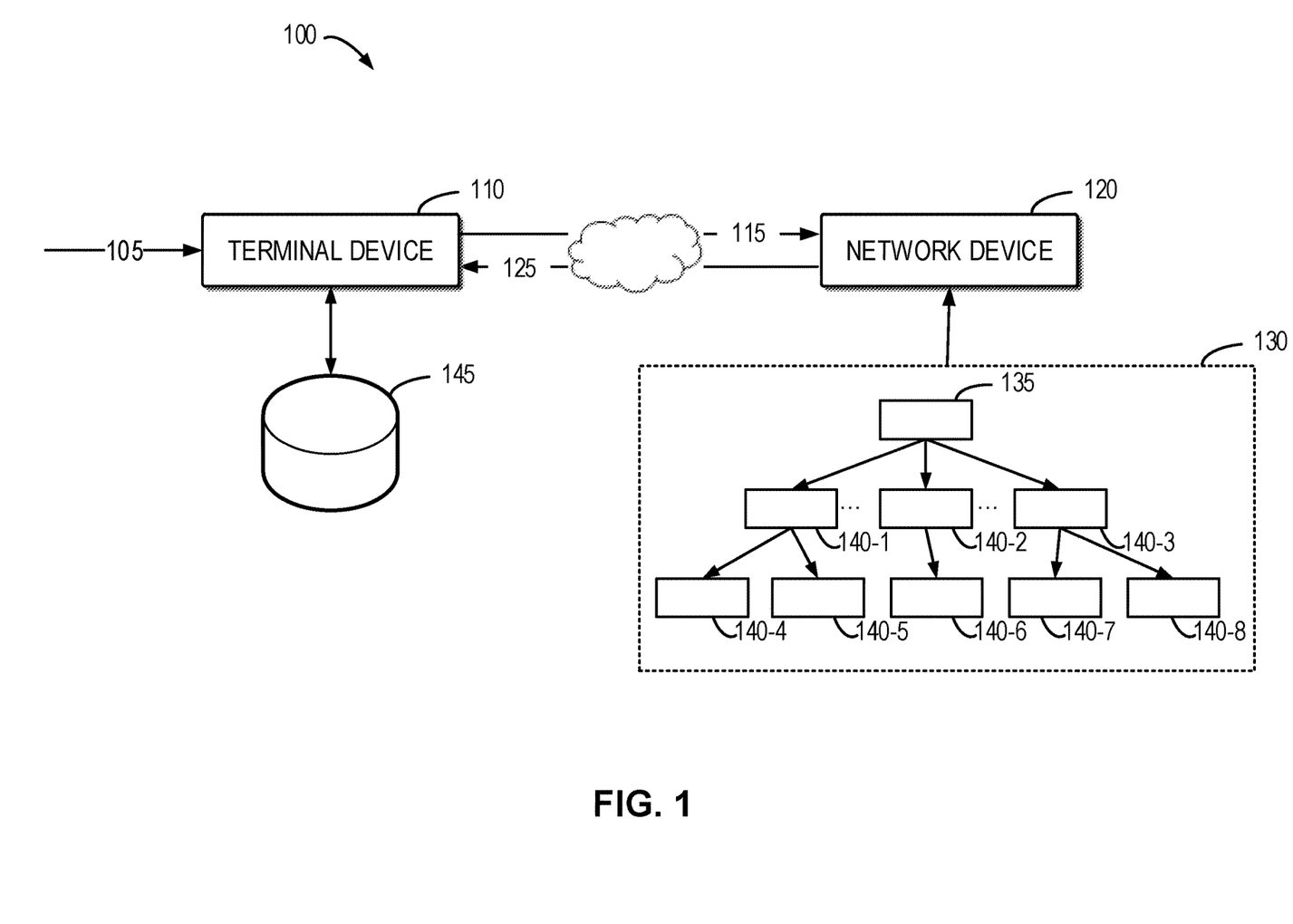
FIG. 1 shows a diagram illustrating an example environment in which embodiments of the present disclosure herein may be implemented.

Hereinafter, embodiments of the present disclosure will be described in detail with reference to the drawings. FIG. 1 shows a diagram illustrating an example environment 100 in which embodiments of the present disclosure herein may be implemented.

As shown in FIG. 1, the environment 100 includes a terminal device 110 and a network device 120. Unlike games that are typically running on a terminal device, games in the present disclosure are running on a network device 120 (e.g., a game server). In the present disclosure, a game may be an entertainment application, an education application, and the like that responds to a user's input and interacts with a user. The game application is not required to be installed on the terminal device 110. In this way, the user won't be limited by the platform of the terminal device 110 for games, and does not need to purchase an expensive terminal device 110.

As shown in FIG. 1, the terminal device 110 can receive an input 105 of a user for a game. In some embodiments, the user may provide the input 105 through a game control device coupled to the terminal device 110. By way of example and not limitation, the game control device may include: a gamepad, a joystick, a mouse, a keyboard, a trackball, or a motion-sensing device, and the like. In some embodiments, the user may also provide the input 105 for the game through voice. In some embodiments, the user may also provide the input 105 by operating the terminal device 110. For example, the terminal device 110 may include a touch screen or the like for receiving input from the user. It should be understood that the input 105 of a user for the game may be obtained in any suitable manner, and the present disclosure is not intended to limit how the input 105 is obtained.

The terminal device 110 can send a message 115 indicating the input 105 to the network device 120, such that the network device 120 determines a candidate game frame 125. As shown in FIG. 1, the network device 120 running the game can obtain a target game frame 135 corresponding to the input and a plurality of game frames 140-1 to 140-8 that are possible to occur subsequent to the target game frame 135. The network device 120 can determine a candidate game frame 125 and send the candidate game frame 125 to the terminal device 110. Accordingly, the terminal device 110 may store the received candidate game frames 125 in a game frame buffer 145. It should be understood that the relationship of the game frames shown in FIG. 1 is only an example. The detailed process of game control according to an embodiment of the present disclosure will be described below with reference to FIGS. 2-5.

Figure 2:
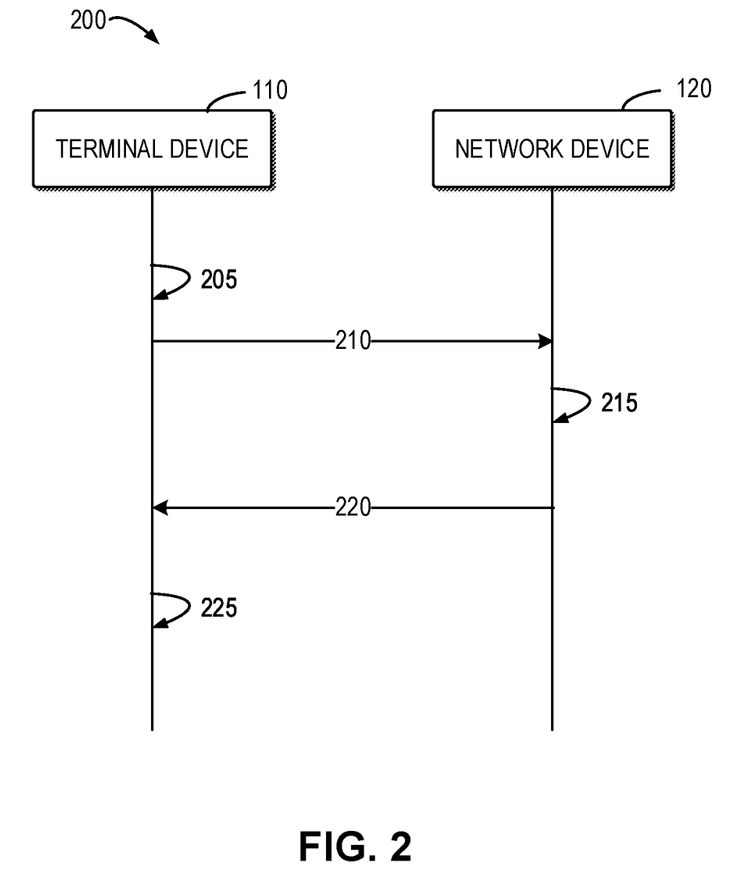
FIG. 2 shows a flowchart of a process of controlling a game according to an embodiment of the present disclosure.

FIG. 2 shows a flowchart of a process 200 of controlling a game according to an embodiment of the present disclosure. For ease of description, the process 200 will be described below with reference to FIG. 1.

At 205, the terminal device 110 receives the input 105 for the game from the user. As discussed above, the input 105 for the game from the user may be obtained in any suitable manner, and the present disclosure is not intended to limit how the input 105 is obtained.

At 210, the terminal device 110 sends to the network device 120 a message 115 indicating the input 105. In some embodiments, the terminal device 110 may directly forward the input 105 to the network device 120.

In some embodiments, although a full game application is not installed on the terminal device 110, the terminal device 110 may be configured with a determination module associated with the game to determine that the input 105 should correspond to a specific target game frame 135. For example, the game may set a corresponding identifier for each game frame that is possible to occur in the game, and store in the terminal device 110 the correspondence between the switch between different game frames and the input, such that the terminal device 110 can determine the identifier of the target game frame 135 based on the currently displayed game frame and the received input 105.

In some embodiments, the terminal device 110 may determine whether the target game frame 135 corresponding to the input 105 has been stored in the game frame buffer 145. Specifically, for a case in which the target game frame 135 is absent in the game frame buffer 145, the terminal device 110 further needs to obtain the target game frame 135 from the network device 120. In some embodiments, the terminal device 110 may indicate in the message 115 that the target game frame 135 is absent, such that the network device 120 also sends the target game frame 135 to the terminal device 110. Alternatively, the terminal device 110 may only forward the input 105 to the network device 120 and the network device 120 determines whether the target game frame 135 has been sent to the terminal device 110.

Additionally, after obtaining the target game frame 135 from the network device 120, the terminal device 110 will provide the user with the target game frame 135 as a response to the input 105. In some embodiments, the terminal device 110 may utilize a display device coupled thereto to provide the user with the target game frame 135. Alternatively, the terminal device 110 may, for example, include a display component for providing the target game frame 135 to a user.

In contrast, for a case in which the target game frame 135 is present in the game frame buffer 145, the terminal device 110 may provide the buffered target game frame 135 to the user, so that the user obtains the response to the input 105 from the game. Since the target game frame 135 has been already buffered locally on the terminal device 110, there is no need to obtain the target game frame 135 from the network device 120 again. Therefore the delay of obtaining a game response for a user will be greatly shortened, thereby improving the user's gaming experience.

In some embodiments, for a case in which the target game frame 135 is present in the game frame buffer 145, the terminal device 110 may send the identification of the target game frame 135 to the network device 120 as the message 115 to indicate that the input 105 has been responded to and game frames subsequent to the target game frame 135 need to be obtained from the network device 120.

At 215, the network device 120 determines a candidate game frame 125, where the candidate game frame is a frame in the game which is possible to occur subsequent to a target game frame 135 corresponding to the input. In some embodiments, as shown in FIG. 1, the network device 120 may maintain a prediction tree 130 corresponding to a game for determining a game frame that is possible to occur subsequent to a specific game frame. For example, a specific frame (for example, a character class selection page) may provide the player with four options (for example, four different character classes), then the specific frame has four possible follow-up frames (game frames corresponding to four different character classes respectively). For a game example in an educational scenario, a specific frame (a page of asking a user a question) gives the user four options (for example, four candidate answers) and each answer will result in a different follow-up frame. In some embodiments, the network device 120 running a game may render in advance game frames that may occur in the future and organize the relationship of these game frames into a prediction tree 130.

In some embodiments, the network device 120 may determine a candidate game frame based on a probability that a game frame is possible to occur. The specific process of 215 will be described below with reference to FIG. 3, which shows a flowchart of a process 300 of determining a candidate game frame according to an embodiment of the present disclosure.

Figure 3:
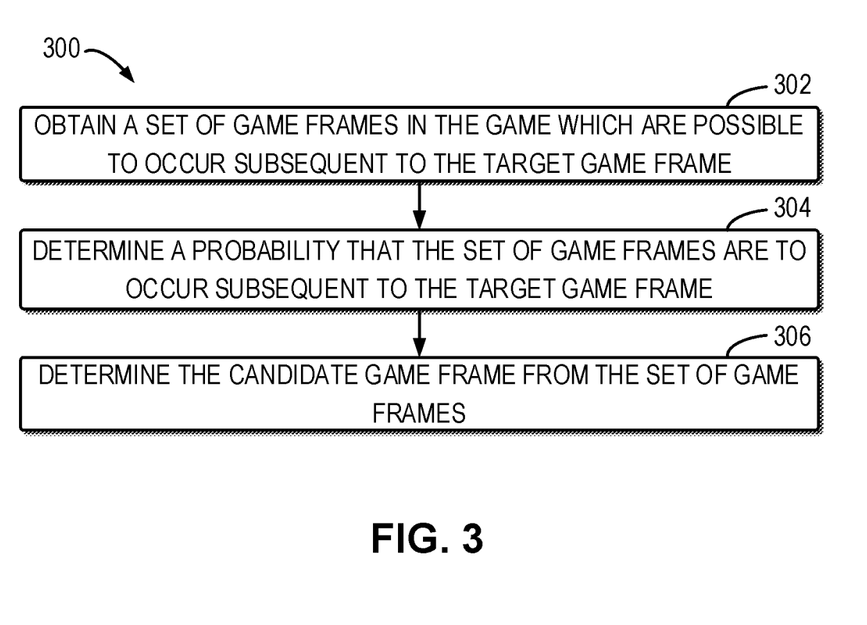
FIG. 3 shows a flowchart of a process of determining a candidate game frame according to an embodiment of the present disclosure.

As shown in FIG. 3, at block 302, the network device 120 may obtain a set of game frames that are possible to occur subsequent to the target game frame 135 in the game. For example, as shown in FIG. 1, the network device 120 may first determine the identifier of the target game frame 135 based on the received information. The network device 120 may further determine a set of game frames 140-1 to 140-8 that are possible to occur subsequent to the target game frame 135 based on the prediction tree 130.

At block 304, the network device 120 may determine the probability that a set of game frames are possible to occur subsequent to the target game frame 135. In some embodiments, the probability that each game frame in the set of game frames is possible to occur subsequent to the target game frame 135 may be determined based on statistics. For example, the probability that a predetermined number of users proceed to the game frames 140-1, 140-2, and 140-3 after the target game frame 135 may be counted, respectively. Similarly, a probability that game frames 140-4 and 140-5 are to occur subsequent to game frame 140-1 and a probability of game frame 140-7 and game frame 140-8 are to occur subsequent to the game frame 140-3 may be further determined. For example, if 40% of the players will provide input after the target game frame 135 to proceed to game frame 140-1, then the probability of game frame 140-1 can be determined to be 0.4; if 60% of the players reach the game frame 140-4 after the game frame 140-1, the probability that the game frame 140-4 is possible to occur subsequent to the target game frame 135 is 0.4*0.6=0.24. It should be understood that the probability that each game frame is to occur subsequent to the target game frame can also be dynamically updated based on the input 105 received from the user for the next determination.

In some embodiments, the network device 120 may also use a machine learning method to determine the probability that a set of game frames are possible to occur subsequent to the target game frame 135 based on the game operations of multiple users. It should be understood that any suitable method may be used to determine the probability that a game frame is to occur subsequent to the target game frame 135.

At block 306, the network device 120 may determine a candidate game frame 125 from a set of game frames based on the probability. In some embodiments, the network device 120 may compare the probability of each of the set of game frames with a predetermined probability threshold. The network device 120 may select a game frame with a probability greater than the probability threshold as the candidate game frame 125. Continuing with the example of FIG. 1, for example, the probability of the game frames 140-1, 140-2, and 140-3 is 0.4, 0.4, and 0.2, respectively. The probability of the game frames 140-4 to game frame 140-8 is 0.24, 0.16, 0.4, 0.1, and 0.1, respectively. The network device 120 may compare these thresholds with a predetermined probability threshold (for example, 0.2), such that the game frames 140-1, 140-2, and 140-4 with a probability greater than 0.2 may be determined as the candidate game frame(s) 125. In such a manner, the embodiments of the present disclosure ensure that game frames which are the most possible to occur are buffered on the terminal device 110 first, thereby ensuring the response speed of the game and reducing the overhead brought by network communication and caching.

Referring back to FIG. 2, at 220, the network device 120 sends the candidate game frame 125 to the terminal device 110. In some embodiments, in order to prevent the network device 120 from redundantly sending the game frames that have been buffered on the terminal device 110, the network device 120 may first determine whether the candidate game frame is marked as having been sent to the terminal device 110. For example, the game frame 140-1 may have been previously sent to the terminal device 110 based on the user's previous input. At this time, although the game frame 140-1 is determined as a candidate game frame, the network device 120 may no longer send the game frame 140-1. In contrast, when the game frame is marked as having not been sent to the terminal device 110, the network device 120 may send the game frame as a candidate game frame 125 to the terminal device 110.

In some embodiments, after sending the candidate game frame 125, the network device 120 may mark the candidate game frame 125 as having been sent to the terminal device 110, to avoid redundantly sending the game frame.

In some embodiments, the message 115 sent by the terminal device 110 to the network device 120 may further indicate the game frames stored in the game frame buffer 145 of the terminal device 110. In this way, the network device 120 may mark and determine which game frames have been sent to the terminal device 110 based on the message 115.

In some embodiments, as discussed above, the terminal device 110 may also determine whether the target game frame 135 needs to be sent to the terminal device 110. Specifically, the network device 120 may determine whether the target game frame 135 is marked as having been sent to the terminal device 110. Upon determining that the target game frame 135 is marked as having not been sent to the terminal device 110, the network device 120 may send target game frame 135 to the terminal device 110 as a response to the input 105 of the user.

At 225, the terminal device 110 stores the candidate game frame 125 in the game frame buffer 145. In such a manner, in the embodiments of the present disclosure, it is possible to asynchronously obtain from a network device one or more subsequent game frames that are possible to occur while the current game frame is provided to the player. A response may then be generated in time when the user performs the corresponding operation. Such a method greatly reduces the delay of the game's response to player input, thereby improving the user's gaming experience.

In some embodiments, in order to effectively manage the game frame buffer 145, the terminal device 110 may also remove an expired game frame from the game frame buffer 145. The expired game frame is a game frame that is not to occur subsequent to the target game frame. For example, the game frame buffer 145 may buffer game frames 140-1, 140-2 and 140-4. For a case in which the user's follow-up input corresponds to the game frame 140-2, the game frames 140-1 and 140-4 are game frames that are not to occur subsequent to the game frame 140-2. Thus, in order to avoid the overflowing of the game frame buffer 145, the terminal device 110 may remove the expired game frames 140-1 and 140-4.

Figure 4:
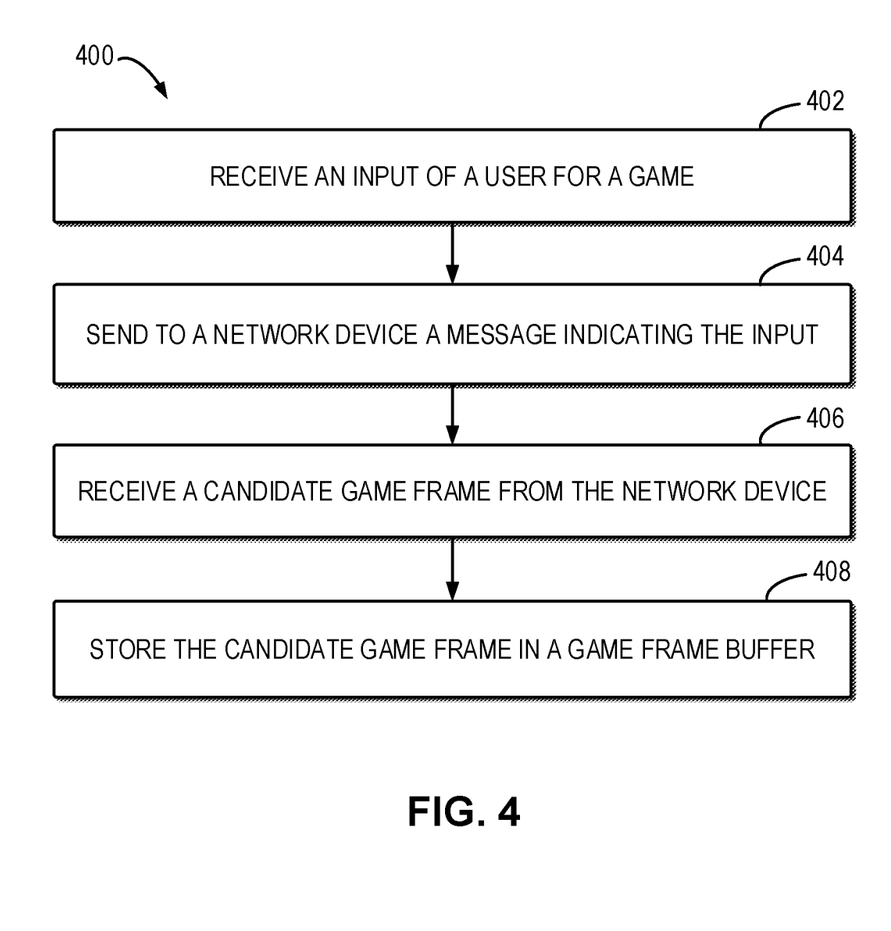
FIG. 4 shows a flowchart of a process of controlling a game according to an embodiment of the present disclosure.

FIG. 4 is a flowchart illustrating a process 400 of controlling a game according to an embodiment of the present disclosure. The process 400 may be implemented, for example, by the terminal device 110 in FIG. 1. As shown in FIG. 4, at the block 402, the terminal device 110 receives the input 105 of a user for a game. At the block 404, the terminal device 110 sends a message 115 to the network device 120 indicating the input 105. At the block 406, the terminal device 110 receives a candidate game frame 125 from the network device 120, where the candidate game frame 125 is a game frame in the game that is possible to occur subsequent to a target game frame 135 corresponding to the input 105, and the candidate game frame 125 is determined by the network device 120 based on the message 115 indicating the input 105. At the block 408, the terminal device 110 stores a candidate game frame 125 in the game frame buffer 145.

Figure 5:
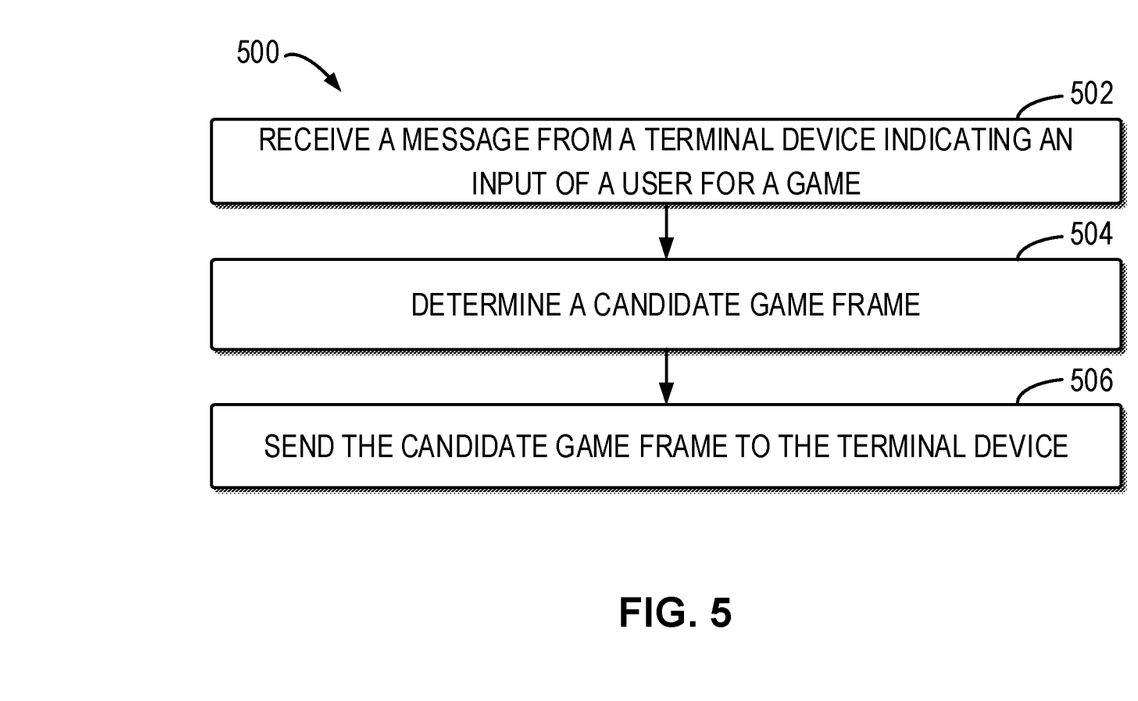
FIG. 5 shows a flowchart of a process of controlling a game according to another embodiment of the present disclosure.

FIG. 5 is a flowchart illustrating a process 500 of controlling a game according to another embodiment of the present disclosure. The process 500 may be implemented, for example, by the network device 120 in FIG. 1. As shown in FIG. 5, at the block 502, the network device 120 receives a message 115 from the terminal device 110 indicating the input 105 of a user for the game. At the block 504, the network device 120 determines a candidate game frame 125, where candidate game frame 125 is a game frame in the game that is possible to occur subsequent to a target game frame 135 corresponding to the input 105. At the block 506, the network device 120 sends the candidate game frame 125 to the terminal device 110.

Figure 6:
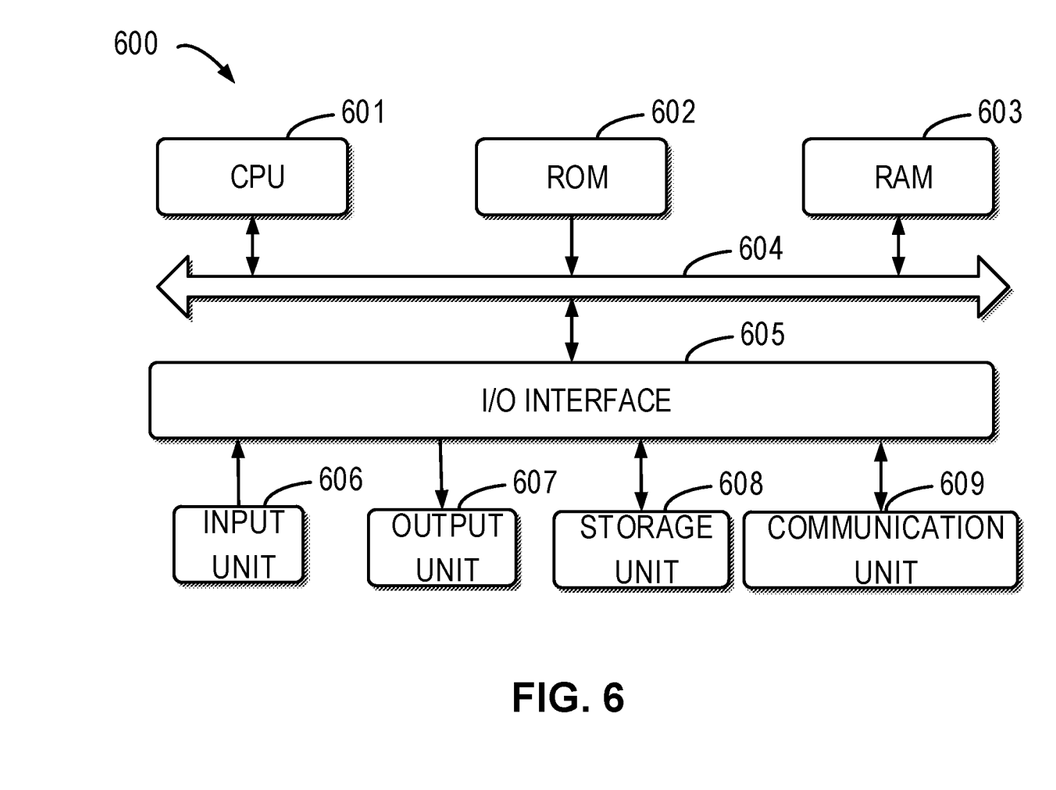
FIG. 6 shows a block diagram illustrating an example device used to implement embodiments of the present disclosure.

FIG. 6 shows a schematic block diagram of an example device 600 that can be used to implement embodiments of the present disclosure. For example, the terminal device 110 and/or the network device 120 as shown in FIG. 1 can be implemented by device 600. As shown, device 600 includes a central processing unit (CPU) 601 that can perform various appropriate actions according to computer program instructions stored in read-only memory (ROM) 602 or loaded from storage unit 608 into a random access memory (RAM) 603. In the RAM 603, various programs and data required for the operation of the device 600 can also be stored. The CPU 601, the ROM 602, and the RAM 603 are connected to each other through a bus 604. An input/output (I/O) interface 605 is also coupled to bus 604.

A plurality of components in device 600 are coupled to I/O interface 605, including: input unit 606, such as a keyboard, mouse, etc.; output unit 607, such as various types of displays, speakers, etc.; storage unit 608, such as a disk and an optical unit, etc.; and a communication unit 609 such as a network card, a modem, a wireless communication transceiver, and the like. Communication unit 609 allows device 600 to exchange information/data with other devices over a computer network such as the Internet and/or various telecommunication networks.

The various processes described above, such as method 400 and/or method 500, may be performed by processing unit 601. For example, in some embodiments, method 400 and/or method 500 can be implemented as a computer software program that is tangibly embodied in a machine-readable medium, such as storage unit 608. In some embodiments, some or the entire computer program may be loaded and/or installed onto device 600 via ROM 602 and/or communication unit 609. One or more actions of method 400 and/or method 500 described above may be performed when a computer program is loaded into RAM 603 and executed by CPU 601.

The present disclosure can be a method, device, system and/or computer program product. The computer program product can include a computer-readable storage medium with computer-readable program instructions for performing various aspects of the present disclosure thereon.

A computer-readable storage medium may be a tangible device that can hold and store the instructions used by the instruction execution device. The computer-readable storage medium can be, for example, but is not limited to, an electrical storage device, a magnetic storage device, an optical storage device, an electromagnetic storage device, a semiconductor storage device, or any suitable combination of the foregoing. More specific examples (non-exhaustive list) of computer-readable storage media include: portable computer disks, hard disks, RAM, ROM, erasable programmable read-only memory (EPROM) or flash memory, static random access memory (SRAM), portable compact disk read-only memory (CD-ROM), digital versatile disk (DVD), memory stick, floppy disk, mechanical encoding device, for example, a hole card with instructions stored thereon or raised structure in a groove, and any suitable combination of the above. The computer-readable storage medium as used herein is not to be interpreted as a transitory signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer-readable program instructions described herein can be downloaded from a computer-readable storage medium to various computing/processing devices, or downloaded to an external computer or external storage device over a network, such as the Internet, a local area network (LAN), a wide area network (WAN), and/or a wireless network. The network may include copper transfer cables, fiber optic transfers, wireless transfers, routers, firewalls, switches, gateway computers, and/or edge servers. A network adapter card or a network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or a similar programming language. The computer-readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a LAN or WAN, or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer-readable program instructions. The electronic circuit can execute computer-readable program instructions to implement various aspects of the present disclosure.

Various aspects of the disclosure are described herein with reference to flowcharts and/or block diagrams of methods, devices (systems) and computer program products according to embodiments of the present disclosure. It will be understood that each block of the flowchart illustrations and/or block diagrams, and combinations of blocks in the flowcharts and/or block diagrams can be implemented by computer-readable program instructions.

These computer-readable program instructions can be provided to a processing unit of a general purpose computer, a special purpose computer or other programmable data processing apparatus to produce a machine such that when the instructions are executed by a processing unit via a computer or other programmable data processing apparatus, devices that implement the functions/acts specified in one or more of the flowcharts and/or block diagrams are produced. The computer-readable program instructions can also be stored in a computer-readable storage medium that causes the computer, programmable data processing device, and/or other device to operate in a particular manner, such that the computer-readable medium storing the instructions includes an article of manufacture that includes instructions for implementing various aspects of the functions/acts recited in one or more blocks of the flowcharts and/or block diagrams.

Computer-readable program instructions can also be loaded onto a computer, other programmable data processing device, or other device to perform a series of operational steps on a computer, other programmable data processing devices or other devices to produce a process that a computer is implemented such that instructions executed on a computer, other programmable data processing apparatuses, or other devices implement the functions/acts recited in one or more of the flowcharts and/or block diagrams.

The flowcharts and block diagrams in the drawings illustrate the architecture, functionality, and operation of possible implementations of devices, methods, and computer program products according to various embodiments of the present disclosure. In this regard, each block in the flowchart or block diagram can represent a module, a program segment, or a portion of an instruction, module, the program segment, or a portion of the instruction including one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, and to enable those of ordinary skill in the art to understand the embodiments in the disclosure.

What is claimed is:

1. A method for controlling a game, comprising:
   in response to receiving, at a terminal device, an input of a user for a game, sending to a network device a message indicating the input;
   receiving a candidate game frame from the network device, the candidate game frame being a frame in the game which is possible to occur subsequent to a target game frame corresponding to the input; and
   storing the candidate game frame in a game frame buffer;
   wherein the candidate game frame is determined by the network device, based on the message indicating the input, utilizing a stored data structure maintained by the network device and specifying a plurality of game frames, including the candidate game frame and a plurality of other game frames, each of which is possible to occur subsequent to the target game frame in the game; and
   wherein the candidate game frame is selected from the plurality of game frames specified by the stored data structure based on probabilities associated with respective ones of the plurality of game frames, each such probability indicating a likelihood of a corresponding one of the plurality of game frames occurring subsequent to the target game frame in the game.

2. The method of claim 1, further comprising:
in response to the target game frame being absent in the game frame buffer, obtaining the target game frame from the network device.

3. The method of claim 2, further comprising:
providing the obtained target game frame to the user.

4. The method of claim 1, further comprising:
in response to the target game frame being present in the game frame buffer, providing the buffered target game frame to the user.

5. The method of claim 1, further comprising:
removing an expired game frame from the game frame buffer, the expired game frame being a frame in the game which is not to occur subsequent to the target game frame.

6. A method for controlling a game, comprising:
in response to receiving a message from a terminal device indicating an input of a user for a game, determining in a network device a candidate game frame, based on the message indicating the input, utilizing a stored data structure maintained by the network device and specifying a plurality of game frames, including the candidate game frame and a plurality of other game frames, each of which is possible to occur subsequent to a target game frame corresponding to the input, the candidate game frame being selected from the plurality of game frames specified by the stored data structure based on probabilities associated with respective ones of the plurality of game frames, each such probability indicating a likelihood of a corresponding one of the plurality of game frames occurring subsequent to the target game frame corresponding to the input; and
sending the candidate game frame to the terminal device.

7. The method of claim 6, wherein determining the candidate game frame comprises:
obtaining a set of game frames in the game which are possible to occur subsequent to the target game frame;
determining a probability that the set of game frames are to occur subsequent to the target game frame; and
determining the candidate game frame from the set of game frames based on the probability.

8. The method of claim 6, wherein sending the candidate game frame to the terminal device comprises:
determining whether the candidate game frame is marked as having been sent to the terminal device; and
in response to the candidate game frame not being marked as having been sent to the terminal device, sending the candidate game frame to the terminal device.

9. The method of claim 6, further comprising:
determining whether the target game frame is marked as having been sent to the terminal device; and
in response to the target game frame not being marked as having been sent to the terminal device, sending the target game frame to the terminal device.

10. The method of claim 6, further comprising:
marking the candidate game frame as having been sent to the terminal device.

11. An electronic device, comprising:
at least one processing unit; and
at least one memory being coupled to the at least one processing unit and storing instructions for execution by the at least one processing unit, the instructions, when executed by the at least one processing unit, causing the device to perform acts comprising:
in response to receiving, at a terminal device, an input of a user for a game, sending to a network device a message indicating the input;
receiving a candidate game frame from the network device, the candidate game frame being a frame in the game which is possible to occur subsequent to a target game frame corresponding to the input; and
storing the candidate game frame in a game frame buffer;
wherein the candidate game frame is determined by the network device, based on the message indicating the input, utilizing a stored data structure maintained by the network device and specifying a plurality of game frames, including the candidate game frame and a plurality of other game frames, each of which is possible to occur subsequent to the target game frame in the game; and
wherein the candidate game frame is selected from the plurality of game frames specified by the stored data structure based on probabilities associated with respective ones of the plurality of game frames, each such probability indicating a likelihood of a corresponding one of the plurality of game frames occurring subsequent to the target game frame in the game.

12. The electronic device of claim 11, wherein the instructions, when executed by the at least one processing unit, further cause the device to perform acts comprising:
in response to the target game frame being absent in the game frame buffer, obtaining the target game frame from the network device.

13. The electronic device of claim 12, wherein the instructions, when executed by the at least one processing unit, further cause the device to perform acts comprising:
providing the obtained target game frame to the user.

14. The electronic device of claim 11, wherein the instructions, when executed by the at least one processing unit, further cause the device to perform acts comprising:
in response to the target game frame being present in the game frame buffer, providing the buffered target game frame to the user.

15. The electronic device of claim 11, wherein the instructions, when executed by the at least one processing unit, further cause the device to perform acts comprising:
removing an expired game frame from the game frame buffer, the expired game frame being a frame in the game which is not to occur subsequent to the target game frame.

16. The electronic device of claim 11, wherein the instructions, when executed by the at least one processing unit, further cause the device to perform acts comprising:
in response to receiving a message from a terminal device indicating an input of a user for a game, determining a candidate game frame, the candidate game frame being a frame in the game which is possible to occur subsequent to a target game frame corresponding to the input; and
sending the candidate game frame to the terminal device.

17. The electronic device of claim 16, wherein determining the candidate game frame comprises:
obtaining a set of game frames in the game which are possible to occur subsequent to the target game frame;
determining a probability that the set of game frames are to occur subsequent to the target game frame; and
determining the candidate game frame from the set of game frames based on the probability.

18. The electronic device of claim 16, wherein sending the candidate game frame to the terminal device comprises:
determining whether the candidate game frame is marked as having been sent to the terminal device; and in response to the candidate game frame not being marked as having been sent to the terminal device, sending the candidate game frame to the terminal device.

19. A computer program product being stored in a non-transitory computer storage medium and comprising machine-executable instructions which, when executed by a device, cause the device to perform the method according to claim 1.

20. A computer program product being stored in a non-transitory computer storage medium and comprising machine-executable instructions which, when executed by a device, cause the device to perform the method according to claim 6.

* * * * *